(12) United States Patent
Nylander et al.

(10) Patent No.: US 6,793,050 B2
(45) Date of Patent: Sep. 21, 2004

(54) DYNAMIC DAMPER

(75) Inventors: Mick A. Nylander, Grand Blanc, MI (US); Gary D. Grabaum, Troy, MI (US)

(73) Assignee: GKN Driveline North America, Inc., AuburnHills, MI (US)

( * ) Notice: Subject to any disclaimer, the term of this patent is extended or adjusted under 35 U.S.C. 154(b) by 0 days.

(21) Appl. No.: 09/943,461

(22) Filed: Aug. 30, 2001

(65) Prior Publication Data

US 2003/0042086 A1 Mar. 6, 2003

(51) Int. Cl.[7] .................................................. F16F 7/10
(52) U.S. Cl. ..................... 188/379; 267/141.1; 464/180
(58) Field of Search ................................ 188/129, 379; 267/276–282, 292–294, 141.1; 464/83, 180, 181; 74/551.1, 551.2, 574, 604

(56) References Cited

U.S. PATENT DOCUMENTS

| | | |
|---|---|---|
| 2,005,934 A | 12/1935 | Carter |
| 4,826,145 A | 5/1989 | Moore et al. |
| 4,909,638 A * | 3/1990 | Muto .......................... 384/273 |
| 5,013,166 A * | 5/1991 | Domer ....................... 384/220 |
| 5,024,425 A | 6/1991 | Schwerdt |
| 5,056,763 A | 10/1991 | Hamada et al. |
| 5,178,375 A | 1/1993 | Hamaekers et al. |
| 5,203,435 A | 4/1993 | Dolgin |
| 5,232,073 A | 8/1993 | Bronowicki et al. |
| 5,660,256 A * | 8/1997 | Gallmeyer et al. ......... 188/379 |
| 5,971,859 A * | 10/1999 | Runge et al. ................ 464/180 |
| 6,007,058 A * | 12/1999 | Kokubo et al. ........ 267/140.12 |
| 6,450,487 B1 * | 9/2002 | Kuwayama .................. 267/141 |

* cited by examiner

Primary Examiner—Pam Rodriguez
(74) Attorney, Agent, or Firm—Jennifer M. Brumbaugh; Mick A. Nylander

(57) ABSTRACT

A dynamic damper for absorbing vibrations in a rotary driveshaft, including a mass member assembly having a plurality of mass members, each mass member having an inner surface, an outer surface, and an affixing member to affix the mass member to another mass member of the assembly, the mass member assembly being affixable to a rotary shaft.

13 Claims, 3 Drawing Sheets

DYNAMIC DAMPER

TECHNICAL FIELD

This invention relates to a dynamic damper for use with a rotary shaft. More specifically, this invention relates to a dynamic damper assembly having a plurality of mass members which are affixable in an assembled position to a rotary driveshaft for use on a motor vehicle.

BACKGROUND ART

It is known that rotary driveshafts and propeller shafts are often used in the power train designs of modem motor vehicles including automobiles. More specifically, it is known that rotary driveshafts are used to drive the front wheels of front wheel drive vehicles and propeller shafts are utilized in driving the rear drive system in rear wheel driven vehicles. In studying the rotational movement of the rotary driveshaft, it is known that certain unbalanced rotation may occur at certain rotational speeds. Undesirable vibrations may be induced into the rotary driveshaft as a result of an unbalanced rotation. These undesirable vibrations often present themselves as bending or torsional forces within the driveshaft during rotation.

It is obvious that bending or torsional forces due to the unbalanced rotation of the rotary driveshafts are not desirable or suitable in the operation of the drive train of most vehicles. It is known to utilize various dynamic dampers and mass dampers to suppress the undesirable vibrations that are induced in the rotary driveshaft due to the unbalanced rotation.

Dynamic dampers are often installed or inserted directly onto the rotary driveshafts. The dynamic damper is designated to generate a prescribed vibrational frequency adjusted to the dominant frequency of the excited harmful vibrations. The dynamic damper converts or transfers the vibrational energy of the rotary drive shaft to the dynamic damper by resonance, and eventually absorbs the vibrational energy of the rotary driveshaft. In short, the dynamic damper attempts to cancel or negate vibrations that are induced onto or caused by the rotary driveshaft in normal operation of the drive train of the vehicle.

It is understood that the ultimate design of front wheel drive rotary driveshafts often depend upon engine compartment space constraints set by the vehicle manufacturers. The eventual size and design of the dynamic damper must therefore be commensurate with the engine compartment design and other vehicle space constraints. Lastly, the dynamic damper must appropriately generate the specific harmonic frequency range that is required to counteract the undesirable vibrations of the rotary driveshaft.

In most powertrain and engine compartment designs, downsizing or reducing the size of most components, including that dynamic damper while still affording the proper horsepower or torque range is desirable. It is therefore important to have a dynamic damper which is as small in overall size as practical while still affording the correct vibrational counteracting frequency range of operation.

U.S. Pat. No. 5,056,763 to Hamada, et al. discloses a dynamic damper. The dynamic damper of Hamada, et al. comprises a pair of ring shaped fixing members spaced apart at a predetermined interval. The dynamic damper of Hamada is inserted onto and supported by the rotary driveshaft. A mass member is disposed between the pair of ring shaped fixing members. A pair of connecting members are then provided to connect the ends of the fixing members to the ends of the mass member. It is noted that the dynamic damper design of Hamada, et al. also requires individual metal clamps to be added on either side and over the ring shaped fixing members to operationally affix the dynamic damper to the rotary shaft. Further, it should be noted that the ring shaped fixing members are spaced apart from the mass member not only in a vertical but also in horizontal direction thereby increasing the overall size of the dynamic damper.

U.S. Pat. No. 5,660,256 to Gallmeyer, et al, addresses the above mentioned problems by providing a dynamic damper for absorbing vibrations in a rotary shaft. The dynamic damper comprises a mass member having an inner surface and an outer surface. A plurality of elongated connecting members extend radially inwardly from the inner surface of the mass member thereby defining a plurality of spaced apart attachment surfaces which directly contact the shaft. As disclosed, the mass member is cylindrical in shape and is of a press fit style which is directly installed around the outer circumference of a rotary driveshaft.

While the above referenced patent to Gallmeyer addresses and solves the problem of undesirable vibrations in a rotary driveshaft, the single piece press fit design requires installation at the time of assembly of the receiving drive shaft and before installation in a vehicle. In some cases, this requirement may cause additional and undesirable time and labor.

Consequently, a need has developed for an improved dynamic damper which may be installed subsequent to the assembly and installation of a receiving driveshaft.

DISCLOSURE OF INVENTION

According to the present invention there is provided a dynamic damper for absorbing vibrations in a rotary driveshaft, the dynamic damper comprises a mass member assembly including a plurality of mass members each having an inner surface and an outer surface. The damper also includes a plurality of elongated connecting members extending radially inwardly from the inner surface of each mass member thereby defining a plurality of spaced apart attachment surfaces. In one embodiment of the present invention, the mass members are affixable when assembled to the rotary driveshaft such that each of the plurality of spaced apart attachment surfaces contacts the rotary driveshaft. The mass member assembly is also spaced apart from the rotary driveshaft and is supported from the connecting members to allow the mass member to vibrate by resonance. The connecting members are thereby subjected to compression deformation between the mass member and the rotary driveshaft.

It is an object of the present invention to provide a dynamic damper which is compact in configuration while still generating upon rotation an inherent harmonic range to dampen the undesirable vibrations caused by the rotary driveshaft.

It is a further object of the present invention to provide a dynamic damper which allows for changes in the harmonic frequency range by adding or deleting a certain predetermined number of radially extending connecting members.

It is yet another object of the present invention to provide a dynamic damper which allows for changes in the harmonic frequency range of the dynamic damper through modifications in the lateral length of the connecting members.

It is yet a further object of the present invention to provide a dynamic damper wherein the rectangular connecting members are equally spaced apart from each other along the inner surface of the cylindrical mass member.

It is still a further object of the present invention to provide a dynamic damper wherein the connecting members are formed from the integral elastic material coating that covers the entire inner and outer surfaces of the cylindrical mass member.

It is yet still another object of the present invention to provide a dynamic damper wherein the mass member constitutes an insert and is molded integrally with the connecting members.

It is yet still a further object of the present invention to provide a dynamic damper which is affixable to a rotary driveshaft subsequent to assembly and installation in a vehicle.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
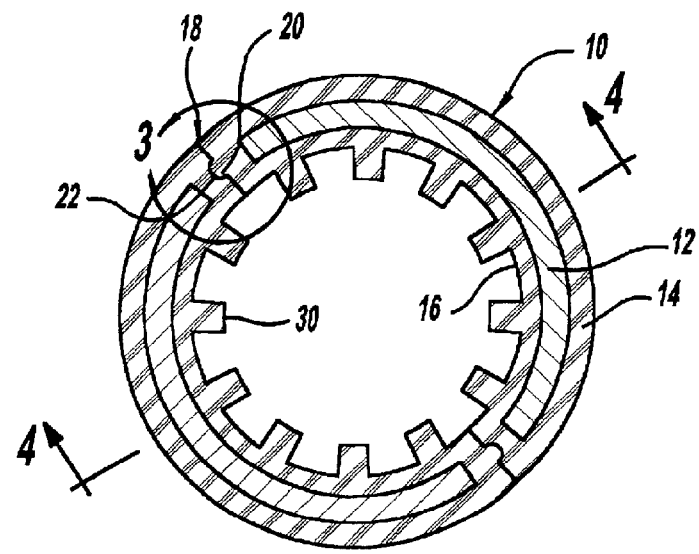
FIG. 1 is a end view of the dynamic damper assembly of the present invention illustrating one configuration of the connecting members.
Figure 2:
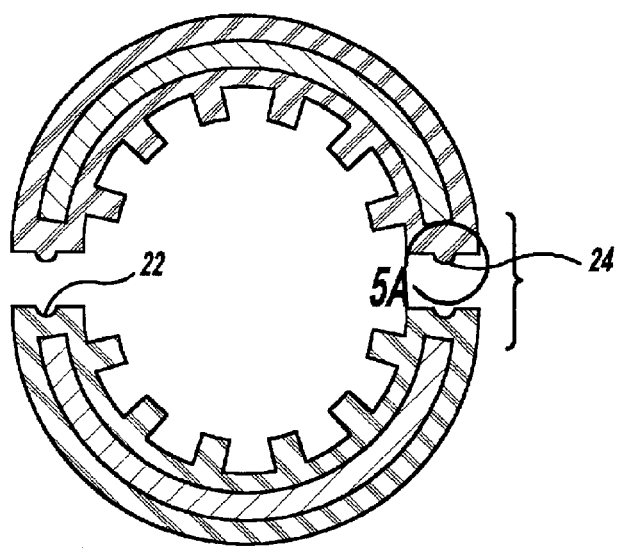
FIG. 2 is a cross sectional view of the dynamic damper assembly of FIG. 1 shown in an unassembled position.
Figure 4:
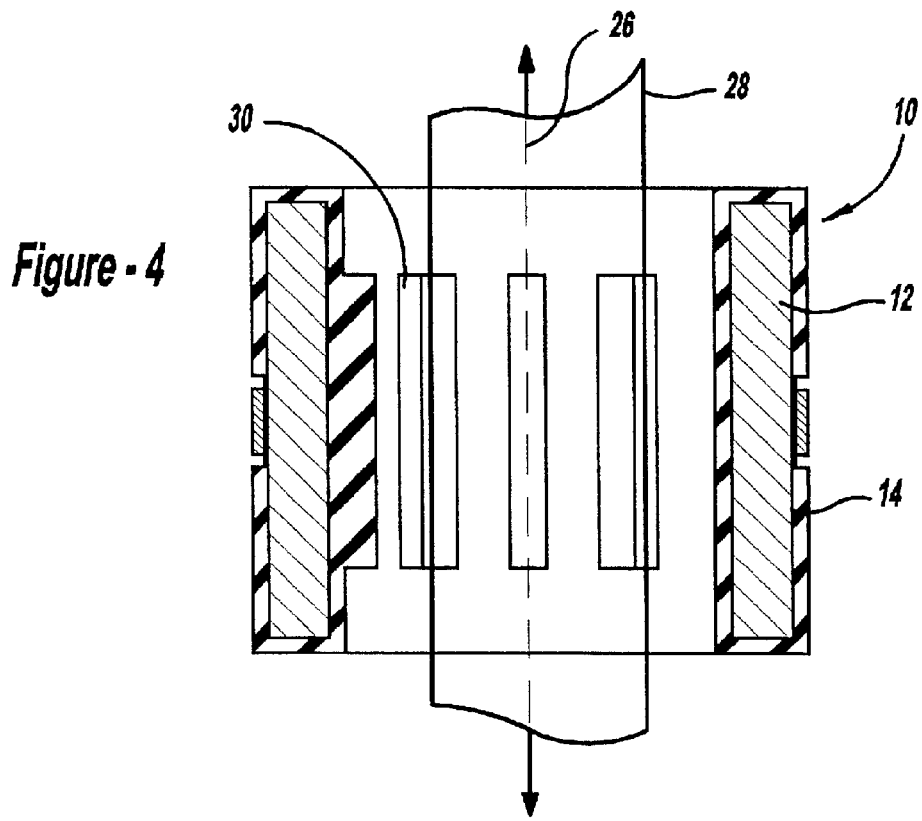
FIG. 4 is a cross sectional view of the dynamic damper assembly of the present invention taken along line 4—4.

Referring to FIGS. 1, 2 and 4 of the drawings, there is shown generally a dynamic damper 10 of the present invention. Dynamic damper 10 includes a mass member assembly 12 comprising a plurality of mass members each having an outer surface 14 and an inner surface 16. Mass member assembly 12 may be manufactured from various metals or alloys or other materials providing a sufficient density to provide the required vibrational frequencies to dampen the harmful vibrations of a rotary driveshaft. The mass member assembly 12 of the preferred embodiment of the present invention is manufactured from a low carbon steel.

Each mass member of assembly 12 further includes affixing means 18 such as, for example, mated tab 20 and receptacle 22 for removably securing each mass member piece to one another to form assembly 12. Of course, any suitable affixing means may be utilized depending on the application, provided that the goal of permitting the damper to be installed subsequent to driveshaft assembly and installation is achieved. Such variations are, therefore, contemplated and deemed to be within the scope of the present invention.

Referring still to FIG. 1, there is shown a plurality of elongated connecting members 24. Each elongated connecting member 24 extends substantially radially inwardly from the inner surface 16 of the mass member 12 toward the central axis of rotation 26 of the rotary driveshaft 28. In the preferred embodiment of the present invention the elongated connecting members 24 are generally rectangular in shape. It is, of course, contemplated in the present invention that the elongated connecting members may be of any suitable shape depending on the application and include, without limitation, for example, frustoconical, inverted frustoconical circular or of any other shape which affords a connecting surface between the rotary driveshaft 28 and the elongated connecting members 24.

Each elongated connecting member 24 includes an attachement surface 30 which faces the central axis of rotation 26. In this manner, the mass member assembly 12 is spaced apart from rotary driveshaft 28 when installed and is also supported by the plurality of connecting members 24 through the contact with the plurality of engaged attachment surfaces 30.

It is further contemplated in the preferred embodiment of the present invention that the elongated connecting members 24 are equidistantly spaced apart along the circumference of the inner surface of the cylindrical mass. Each elongated connecting member 24 is made from an elastomeric material which is capable of absorbing compression forces of varying amounts. It is further contemplated in the preferred embodiment of the present invention that the cylindrical mass member 12 is coated with a elastomeric material such as a rubber and that the elongated connecting members 24 are integrally connected to the coating and cylindrical mass member 12. The cylindrical mass member 12 may also be insert molded during the molding process such that the coating and connecting members are integrally connected as one contiguous piece to the cylindrical mass member 12.

The above specification is only an example of the corresponding relationship between a dynamic damper and a rotary driveshaft and many various combinations, dynamic dampers and rotary driveshafts are possible. The size of the CV joints used will also vary the size of the damper 10 and its mass member 12. It should be noted that the present invention allows for changes of the frequency range of the dynamic damper 10 not only by changes in the size and weight of the mass member 12, but also through changes in the hardness and composition in the rubber, the number of connecting members 24 that are set forth throughout the inner surface 16 of the mass member 12, the lateral length of the connecting member 24, and the width of the attachment surface 30. This allows for greater use of the dynamic damper design of the present invention in many various rotary driveshaft applications without significant changes in the manufacturing process of the dynamic damper.

In operation, when the rotary driveshaft 28 of the present invention rotates, undesirable vibrations may be created in the rotary driveshaft. The mass member 12 of a dynamic damper 10 therefore begins to resonate through the rotation of the rotary driveshaft 28. The intrinsic frequency of the mass member 12 is adjusted to the frequencies of the undesirable vibrations and the adjustment of the intrinsic frequency is performed, as discussed above.

Figure 6:
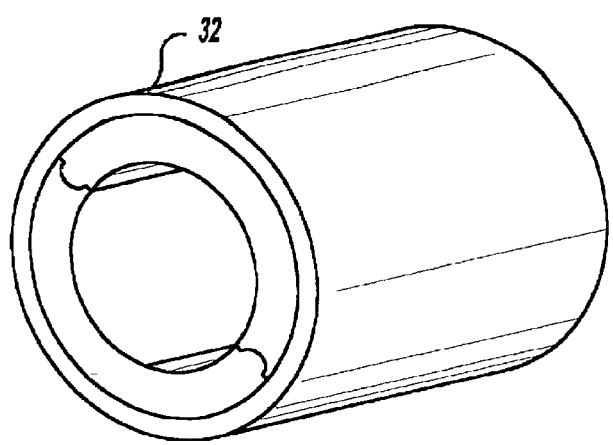
FIG. 6 is a perspective view of an alternative embodiment of the present invention showing a housing affixable to the outer surface of the mass member assembly of FIG. 1.
Figure 7:
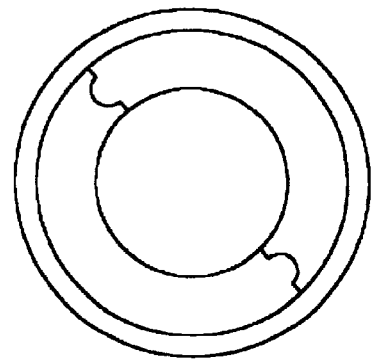
FIG. 7 is a side view of the alternative embodiment of the present invention shown in FIG. 6.

Referring now to FIG. 6, there is shown an alternative embodiment of the present invention. A housing 32 is provided that is affixable to and envelopes the outer surface 14 of mass member assembly 12. In the preferred embodiment shown, housing 32 encloses substantially all of outer surface 14. Again, however, it is understood that any suitable housing may be used that encloses less of surface 14. This housing 32 may comprise, for example, an annular ring, a mesh, etc. Housing 32 may also comprise any suitable material including, without limitation, metal rubber, plastic, etc. As shown in the alternative embodiment of FIG. 6, connecting members 24 have been removed. Accordingly, inner surface 16 contacts the driveshaft 28 directly when assembled. Of course, the removal of connecting members 24 depends on the application and is not in any way required by the addition or deletion of housing 32.

Figure 5A:
FIG. 5A is a partially segmented side view of one different alternative affixing member of the present invention.
Figure 5B:
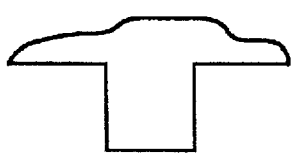
FIG. 5B is a partially segmented side view of yet another different alternative affixing member of the present invention.
Figure 5C:
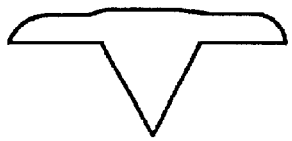
FIG. 5C is a partially segmented side view of yet another different alternative affixing member of the present invention.

Turning now to FIGS. 5A–5C, there are shown a variety of locking means 18 including male tabs 20 which may be semicircular, rectangular, triangular, or any other suitable shape. Of course, in each case, a female receptacle 20 having the same or other suitable shape will be required.

As shown in FIG. 1, mass member assembly 12 is in a closed or assembled position prior to attachment to a driveshaft 28. Mass member assembly 12 is shown in an open or unassembled position in FIG. 2. Connecting members 24 will, of course, become compressed by the force of driveshaft 28 when mass member assembly 12 is assembled and installed about driveshaft 28. In keeping with the invention, a preferred range from 0.25 mm to 2.0 mm of interference fit is desirable, to obtain the proper fit for the damper 10 on the shaft 28. The attachment surfaces 20 directly contact and engage the rotary driveshaft 28 such that the dynamic damper 10 can be adequately connected to the rotary driveshaft without the use of clamps. This is particularly useful in manufacturing and assembly operations and provides a significant cost savings.

Figure 3:
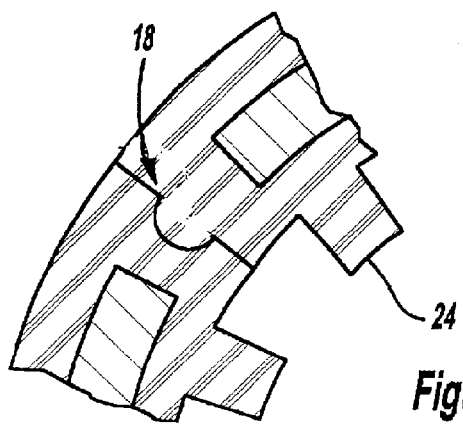
FIG. 3 is a partially segmented side view of the connecting member of the present invention.

Referring to FIGS. 1–3, it is shown that the connecting members 24 are generally rectangular in shape. The connecting members 24 preferably, but not necessarily, extend along at least 25% of the inner surface of the cylindrical mass member 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A dynamic damper, comprising:
a mass member assembly including a plurality of discrete mass members, each mass member having an inner surface, and an outer surface, said inner surface and outer surface form a coating that covers each mass member entirely, and a first and second affixing member for affixing the mass member to another mass member of the assembly, said first and second affixing members including a first and second tab arranged on one of said mass members and a first and second receptacle arranged on the other of said mass members, the mass member assembly being affixable to a rotary shaft.

2. A dynamic damper as in claim 1, wherein one of said affixing members comprises one of said tabs for receipt by one of said receptacles of another mass member.

3. A dynamic damper as in claim 1, wherein one of said affixing members comprises one of said receptacles for receipt by one of said tabs of another mass member.

4. A dynamic damper as in claim 1, wherein the mass member assembly is cylindrical in shape when in the assembled position.

5. A dynamic damper as in claim 1, wherein said mass members are made of a steel material.

6. A dynamic damper as in claim 1, wherein said inner surface, said outer surface and said affixing members are made of an elastic material.

7. A dynamic damper, comprising:
a mass member assembly including a plurality of mass members, each mass member having an inner surface extending from said mass member, and an outer surface, said inner surface and outer surface form a coating that covers each mass member entirely, the mass member assembly being affixable to a rotary shaft; and a plurality of elongated connecting members each molded integrally with and extending radially inwardly from the inner surface of each mass member toward the rotary shaft thereby defining a plurality of spaced apart attachment surfaces, wherein each of the plurality of spaced apart attachment surfaces secures the damper in the closed position to the rotary shaft, the mass member assembly being spaced apart from the rotary shaft and being supported by the connecting members directly contacting the shaft to allow the mass member assembly to vibrate by resonance, and the connecting members being subjected substantially to compressive deformation between the mass member assembly and the rotary shaft.

8. A dynamic damper as in claim 7, wherein the rotary shaft has a central axis of rotation and each of the plurality of spaced apart attachment surfaces is aligned in a direction substantially parallel thereto.

9. A dynamic damper as in claim 7, wherein the connecting members are equidistantly spaced apart from each other along the inner surface of each of the mass members.

10. A dynamic damper as in claim 7, wherein the connecting members, the inner surface, and the outer surface are formed from an elastic material.

11. A dynamic damper as in claim 10, wherein the elastic material is rubber.

12. A dynamic damper as in claim 7, wherein each mass member is insert molded integrally with the connecting members.

13. A dynamic damper as in claim 7, wherein the connecting members are generally rectangular in shape and extend along at least 25% of the inner surface of each mass member.

* * * * *